US007782431B2

(12) United States Patent
Bang

(10) Patent No.: US 7,782,431 B2
(45) Date of Patent: Aug. 24, 2010

(54) ROLL PRINTING DEVICE, ROLLING PRINTING METHOD AND METHOD FOR MANUFACTURING LIQUID CRYSTAL DISPLAY DEVICE USING THE SAME

(75) Inventor: Young Phil Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1013 days.

(21) Appl. No.: 11/477,816

(22) Filed: Jun. 30, 2006

(65) Prior Publication Data

US 2007/0153182 A1 Jul. 5, 2007

(30) Foreign Application Priority Data

Dec. 29, 2005 (KR) ...................... 10-2005-0133129

(51) Int. Cl.
*G02F 1/1337* (2006.01)
*G02F 1/13* (2006.01)

(52) U.S. Cl. ........................ 349/126; 349/187; 349/124

(58) Field of Classification Search ................. 349/126, 349/124

See application file for complete search history.

(56) References Cited

U.S. PATENT DOCUMENTS 5,522,446 A 6/1996 Mullet et al.
5,533,446 A * 7/1996 Hashimura et al. .......... 101/150
6,148,728 A * 11/2000 Shin et al. ................... 101/483
6,999,148 B2 * 2/2006 Lee ............................ 349/124
7,450,213 B2 * 11/2008 Kim et al. ................... 349/187
2003/0093172 A1 5/2003 Lee

FOREIGN PATENT DOCUMENTS

| | | |
|---|---|---|
| JP | 2000-335126 | 12/2000 |
| JP | 2002-264295 | 9/2002 |
| JP | 2004-276390 | 10/2004 |
| JP | 2004-325784 | 11/2004 |
| JP | 2005-014468 | 1/2005 |
| JP | 2005-028818 | 2/2005 |
| JP | 2005-141235 | 6/2005 |
| KR | 1020050039186 | 4/2005 |

OTHER PUBLICATIONS

Machine Translation of JP2000-335126; May 12, 2000.*

* cited by examiner

*Primary Examiner*—David Nelms
*Assistant Examiner*—W. Patty Chen
(74) *Attorney, Agent, or Firm*—McKenna Long & Aldridge LLP

(57) ABSTRACT

A roll printing device, a roll printing method, and a method for manufacturing a liquid crystal display device using the same. The roll printing device includes a dispenser; an anilox roll to receive a designated material dispensed by the dispenser; a printing roll engaged with the anilox roll to rotate with the printing roll to receive the designated material supplied from the anilox roll; and a substrate stage fixed below the printing roll for mounting a substrate. The printing roll is movable on the substrate stage to deposit the designated material on the substrate.

14 Claims, 4 Drawing Sheets

ROLL PRINTING DEVICE, ROLLING PRINTING METHOD AND METHOD FOR MANUFACTURING LIQUID CRYSTAL DISPLAY DEVICE USING THE SAME

This application claims the benefit of Korean Patent Application No. P2005-0133129, filed Dec. 29, 2005, which is hereby incorporated by reference for all purposes as if fully set forth herein. This application incorporates by reference co-pending application Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a roll printing device for depositing an orientation film of a liquid crystal display device, and more particularly, to a roll printing device, which is applied to a large-sized substrate.

2. Discussion of the Related Art

Among various ultra-thin flat type display devices, which include a display screen having a thickness of no more than several centimeters, liquid crystal display (LCD) devices are widely used for notebook computers, monitors, aircraft, etc. because they have advantages such as low power consumption and portability.

A typical liquid crystal display device includes upper and lower substrates separated by a designated interval and opposite to each other, with a liquid crystal layer interposed between the upper and lower substrates. The orientation of the liquid crystal layer is controlled by the presence or absence of a voltage applied between the upper and lower substrate. Because of an anisotropic property of the liquid crystal, light transmittance through the liquid crystal changes with changes in the orientation of the liquid crystal layer, allowing the liquid crystal display device to produce an image.

When the orientation of the liquid crystal layer is not uniform, it is difficult to obtain the desired image. Accordingly, an orientation film for uniformly maintaining initial orientation state of the liquid crystal layer is formed on the upper and lower substrates.

The orientation direction of the orientation film may be established using a rubbing method or a light irradiating method.

In the rubbing method, a thin orientation film is deposited on a substrate, and a rubbing roll onto which a rubbing cloth is wound is rolled on the orientation film, thereby orienting the orientation film in a designated direction.

In the light irradiating method, a thin orientation film is deposited on a substrate, and ultraviolet rays, such as polarized rays or non-polarized rays, are irradiated onto the orientation film. A reaction resulting from the irradiation orients the orientation film in a designated direction.

When using either the rubbing or the light irradiating method, an orientation film having a small thickness is uniformly deposited on a substrate. A related art roll printing method is used to deposit the orientation film.

Hereinafter, with reference to the accompanying drawings, a roll printing method according to a related art will be described.

FIG. 1 is a schematic sectional view illustrating a method for depositing an orientation film using a related art roll printing device.

Before describing the process for depositing the orientation film using the roll printing device is described, the structure of the roll printing device of the related art will be described.

As shown in FIG. 1, a roll printing device of the related art includes a roll printing unit 1 and a substrate stage unit 3.

The roll printing unit 1 includes a dispenser 14, a doctor roll 16, an anilox roll 18, and a printing roll 20.

The doctor roll 16 engages the anilox roll 18, and the anilox roll 18 engages the printing roll 20.

A printing mask 22 having a shape corresponding to the deposition pattern of a desired orientation material 15 is attached to the printing roll 20.

The substrate stage unit 3 includes a substrate stage 12, and a substrate 10 mounted on the substrate stage 12.

Hereinafter, a method for depositing or forming an orientation film using the above roll printing device is described. First, the dispenser 14 supplies or dispenses the orientation material 15 to the anilox roll 18. The orientation material 15 supplied to the anilox roll 18 is uniformly spread by the doctor roll 16 engaged with the anilox roll 18, and is then deposited onto the printing mask 22 attached to the printing roll 20. The above process is performed by respectively rotating the doctor roll 16, the anilox roll 18, and the printing roll 20 in directions indicated by respective arrows.

The substrate stage 12, on which the substrate 10 is mounted, moves in a direction indicated by an arrow under the printing roll 20. While the substrate stage 12 moves, the substrate 10 mounted on the substrate stage 12 and the printing mask 22 attached to the printing roll 20 contact each other and the orientation material 15 deposited onto the printing mask 22 forming a thin film of orientation material 15 on the printing mask. As the printing mask 22 rotates in contact with the substrate 10, the thin film of orientation material 15 on the printing mask 22 is transcribed onto the substrate 10.

In the above-described roll printing device of the related art, the roll printing unit 1 is fixed and the substrate stage unit 3 moves, thus allowing the orientation material 15 to be deposited on the substrate 10.

However, when forming an orientation layer on a large sized substrate, the movement of the substrate stage unit 3 during forming the orientation layer is increased, thereby increasing the space occupied by the roll printing device, and lowering space utilization.

SUMMARY OF THE INVENTION

Accordingly, the present invention is directed to a roll printing device for depositing or forming an orientation film of a liquid crystal display device, a roll printing method, and a method for manufacturing a liquid crystal display device using the same that substantially obviates one or more of the problems due to limitations and disadvantages of the related art.

An advantage of the present invention is to provide a roll printing device, which reduces a space occupied thereby when the roll printing device is applied to a large-sized substrate, thus increasing space utilization.

Another advantage of the present invention is to provide a roll printing method, which reduces a space occupied by a roll printing device when the roll printing method is applied to a large-sized substrate, thus increasing space utilization.

Another advantage of the present invention is to provide a method for manufacturing a liquid crystal display device using the roll printing method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, roll printing device includes: a dispenser; an anilox roll to receive a designated material dispensed by the dispenser; a printing roll engaged with the anilox roll to rotate therewith to receive the designated material supplied from the anilox roll; and a substrate stage fixed below the printing roll to mount a substrate thereon, wherein the printing roll is movable on the substrate stage to deposit the designated material on the substrate.

In another aspect of the present invention, a roll printing method includes dispensing a designated material on a rotating anilox roll using a dispenser; supplying the designated material from the anilox roll to a printing roll engaged with the anilox roll and to rotate therewith; and moving the printing roll to deposit the designated material on a substrate mounted on a substrate stage.

In yet another aspect of the present invention, a method for manufacturing a liquid crystal display device includes preparing a lower substrate and an upper substrate; depositing an orientation film on at least one of the lower and upper substrates; and forming a liquid crystal layer between the two substrates, wherein the depositing of the orientation film is performed using the above roll printing method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Rolling printing device and roll printing method will be described hereinafter.

Figure 1:
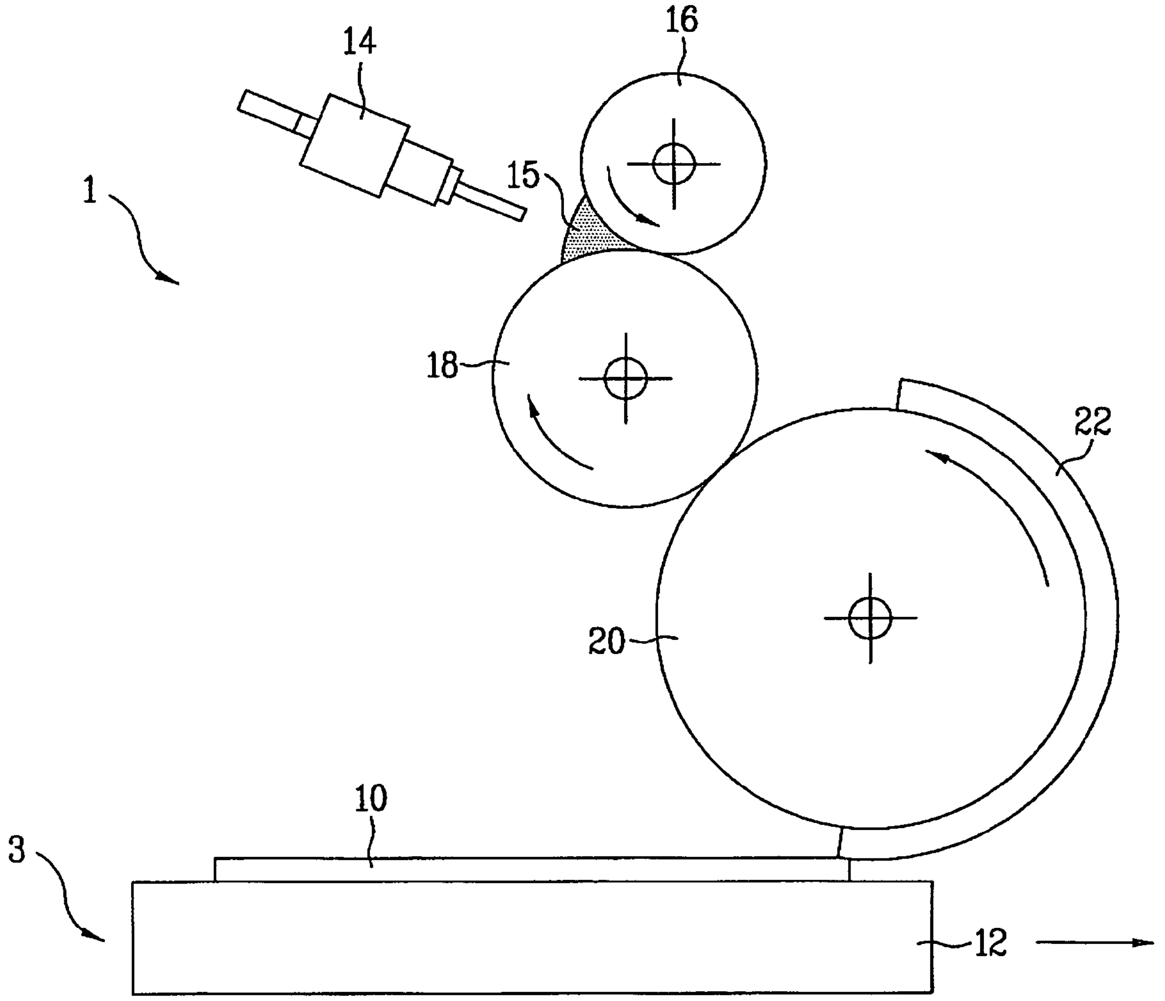
FIG. 1 Related Art
FIG. 1 is a schematic sectional view illustrating a method for depositing an orientation film using a roll printing device of the related art.
Figure 2:
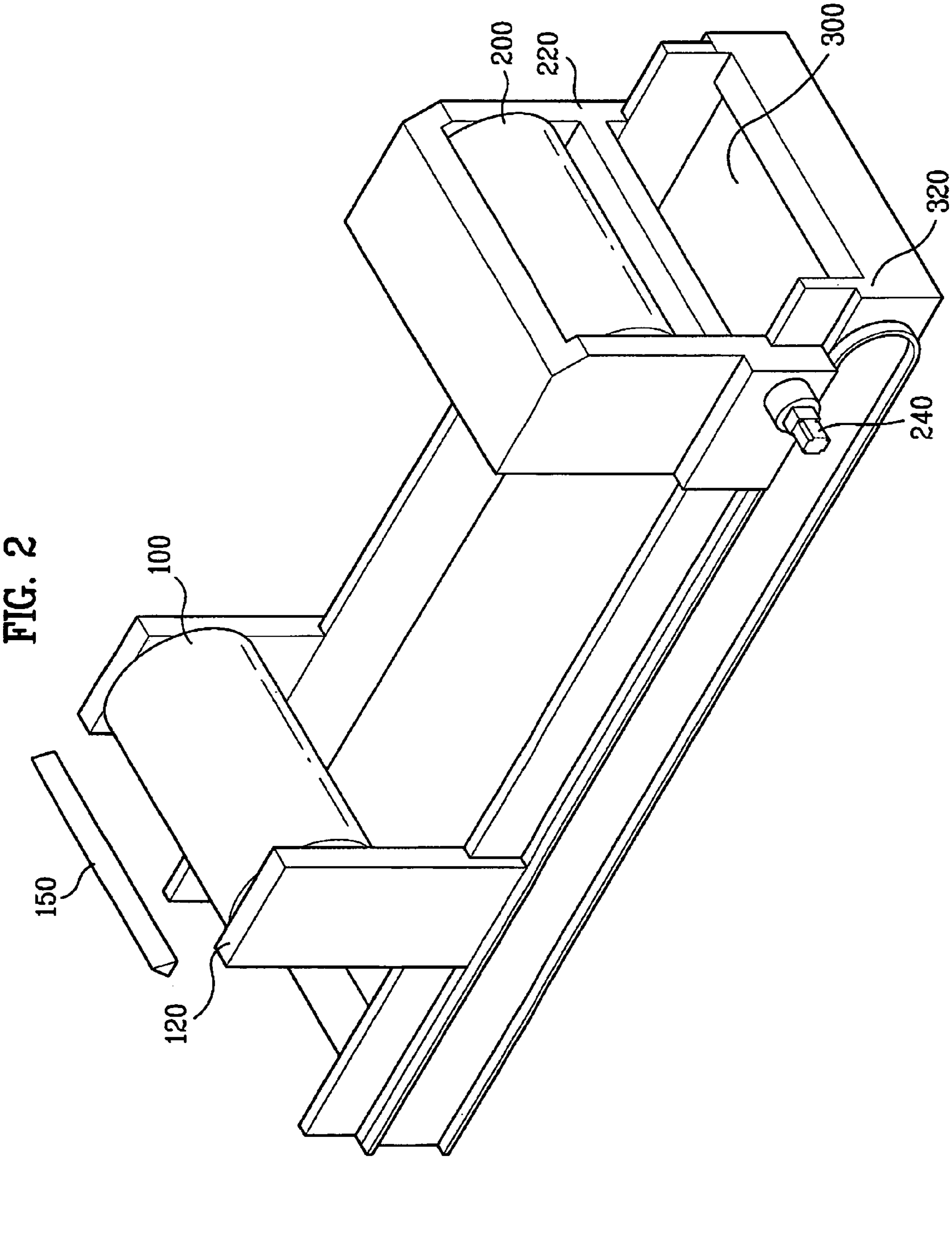
FIG. 2 is a schematic perspective view of a roll printing device in accordance with a first embodiment of the present invention.

FIG. 2 is a schematic perspective view of a roll printing device in accordance with a first embodiment of the present invention.

The roll printing device illustrated in FIG. 2 includes a dispenser, an anilox roll 100, a printing roll 200, and a substrate stage 300.

The dispenser serves to dispense a designated material to the anilox roll 100.

The anilox roll 100 serves to transfer the designated material, dispensed by the dispenser, onto the printing roll 200. The anilox roll 100 is supported by an anilox roll frame 120.

The printing roll 200 serves to receive the designated material supplied to the anilox roll 100, and then to move on the substrate stage 300 to deposit the designated material on a substrate mounted on the substrate stage 300. The printing roll 200 is supported by a printing roll frame 220.

A motor 240 is connected to the printing roll frame 220 supporting the printing roll 200. The printing roll 200 moves by the operation of the motor 240.

As shown in FIG. 2, the printing roll 200 is separated from the anilox roll 100 and moves across the substrate stage 300 to engage the printing roll 200. When the anilox roll 100 engages the printing roll 200, the printing roll 200 can be rotated to receive the designated material from the anilox roll 100. After receiving the designated material from the anilox roll 100, the printing roll is moved across the substrate stage 300, separating from the anilox roll 100 and depositing the designated material on the substrate mounted on the substrate stage 300.

The substrate stage 300 serves to mount the substrate thereon. The substrate stage 300 is supported by a substrate stage frame 320 which is maintained in a fixed position.

The roll printing device may further include a doctor roll engaging the anilox roll 100 and rotating therewith to order to uniformly spread the designated material from the anilox roll to the printing roll 200. Alternatively, a doctor blade 150 contacting the anilox roll 100 may be used to uniformly spread the designated material.

Hereinafter, a roll printing method using the roll printing device of the first embodiment will be described.

First, the dispenser dispenses the designated material to the rotating anilox roll 100.

Thereafter, the anilox roll 100 supplies the designated material to the printing roll 200, engaged with the anilox roll and rotated therewith.

The dispensing of the designated material to the anilox roll 100 and the supply of the designated material from the anilox roll 100 to the printing roll 200 may be simultaneously performed.

By using a doctor roll engaged with the anilox roll 100 and rotated therewith, or by using a doctor blade contacting the anilox roll 100, the designated material supplied from the anilox roll 100 to the printing roll 200 can be uniformly spread onto the printing roll 200.

Thereafter, the printing roll 200 moves along the substrate stage depositing the designated material on the substrate mounted on the substrate stage 300.

By moving the printing roll 200 rather than the substrate stage 300, the space occupied by the roll printing device is not increased when the size of the substrate is increased.

Figure 3:
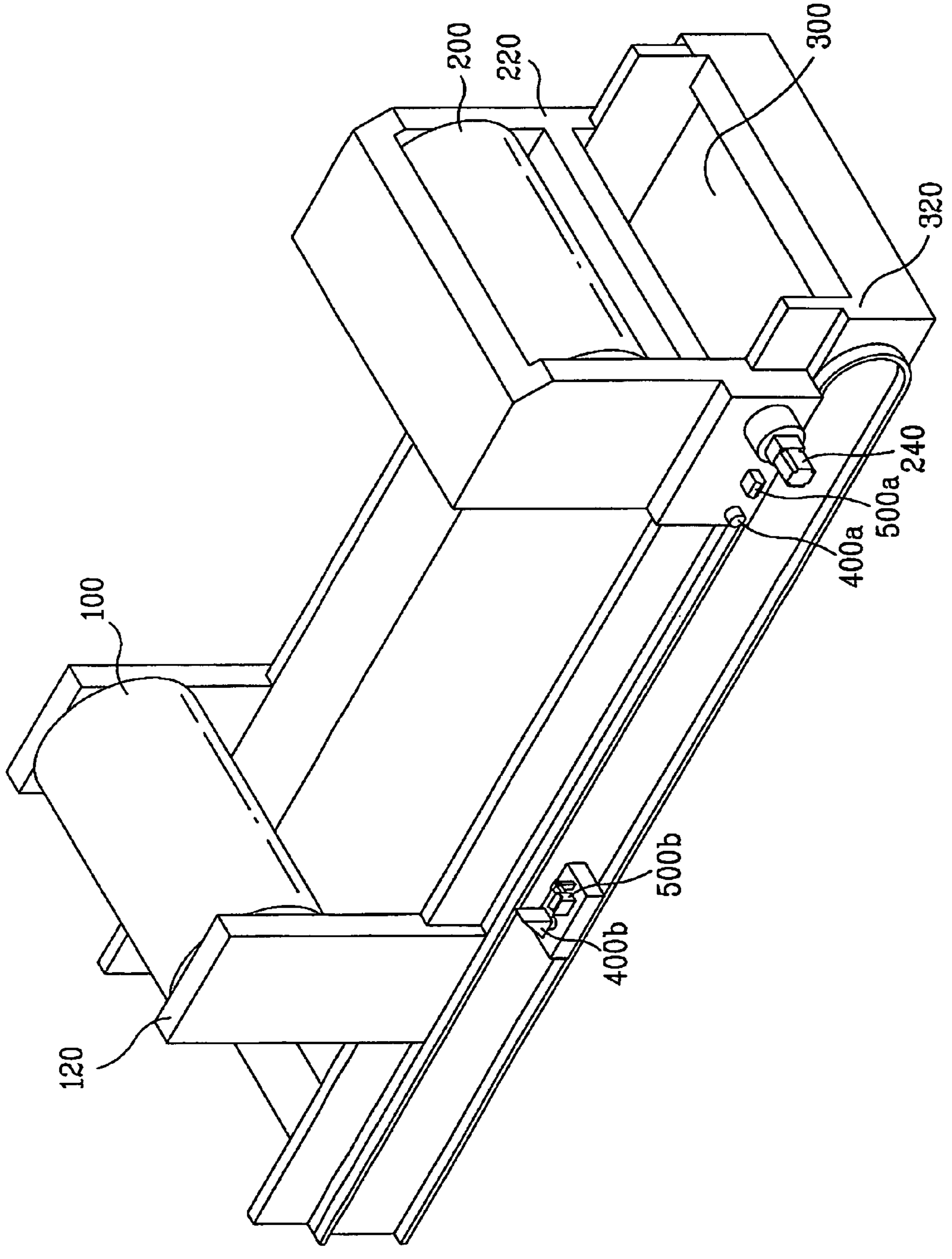
FIG. 3 is a schematic perspective view of a roll printing device in accordance with a second embodiment of the present invention.
Figure 4A:
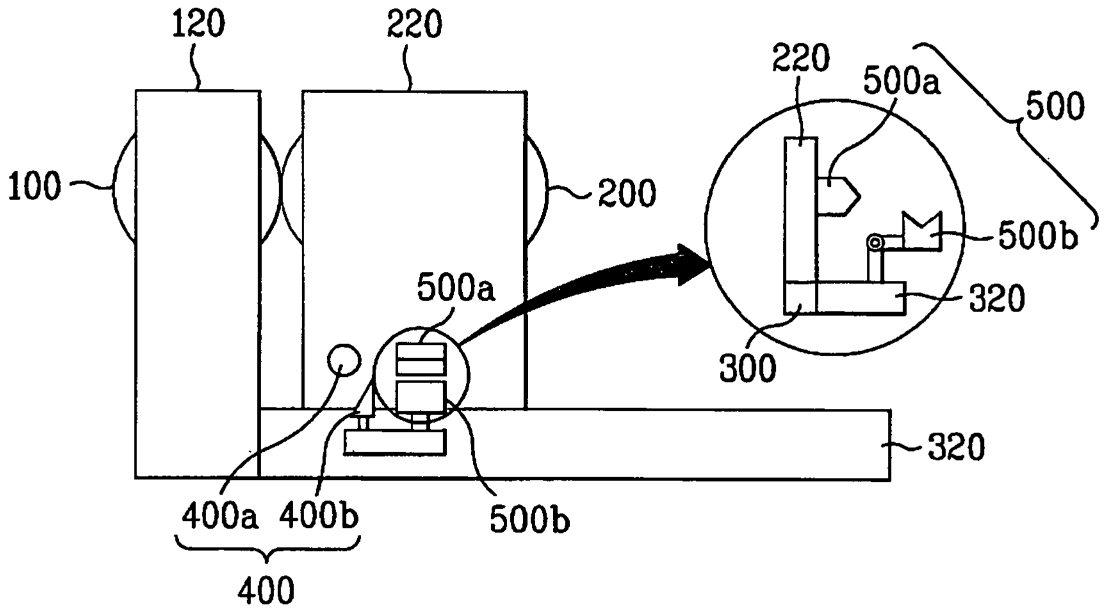
FIG. 4A is a schematic sectional view illustrating the roll printing device in accordance with the second embodiment, with vibration dampeners disconnected from the roll printing device.
Figure 4B:
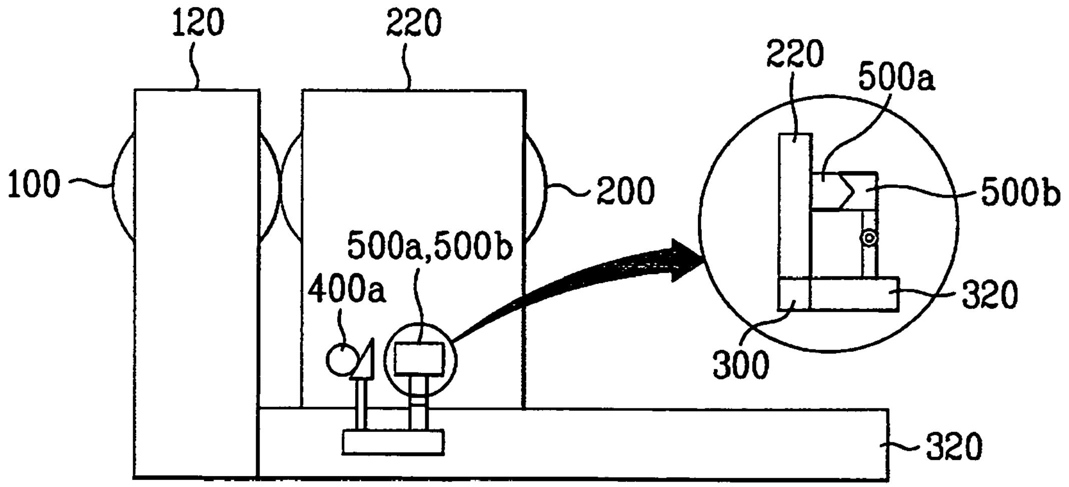
FIG. 4B is a schematic sectional view of the roll printing device in accordance with the second embodiment, showing the vibration dampeners connected to the roll printing device.

FIG. 3 is a schematic perspective view of a roll printing device in accordance with a second embodiment of the present invention; FIG. 4A is a schematic sectional view of the roll printing device in accordance with the second embodiment, showing vibration dampeners disconnected from the roll printing device; and FIG. 4B is a schematic sectional view of the roll printing device in accordance with the second embodiment showing the vibration dampeners connected to the roll printing device.

The roll printing device of the second embodiment is the same as the roll printing device of the first embodiment except that the roll printing device of the second embodiment further includes a vibration dampener for preventing or reducing the generation of vibration when an anilox roll and a printing roll are engaged with each other and rotated. Accordingly, parts included in the second embodiment that are substantially the same as those in the first embodiment, are denoted by the same reference numerals even though they are depicted in different drawings.

As shown in FIG. 3, the roll printing device in accordance with the second embodiment includes a dispenser, an anilox roll 100, a printing roll 200, a substrate stage 300, and a vibration dampener.

The dispenser, the anilox roll 100, the printing roll 200, and the substrate stage 300 of this embodiment are the same as those of the first embodiment, and a detailed description thereof will be thus omitted.

The vibration dampener includes a horizontal vibration dampener 400 and a vertical vibration dampener 500.

The horizontal vibration dampener 400 includes a first structure 400*a* formed on the printing roll frame 220 supporting the printing roll 200, and a second structure 400*b* formed on the substrate stage frame 320 supporting the substrate stage 300. When the first structure 400*a* and the second structure 400*b* are engaged, horizontal vibration of the printing roll 200 is prevented or reduced.

The first structure 400*a* has a shape having a curved surface and the second structure 400*b* has a shape including an inclined surface. For example, the first structure may have a spherical shape while the second structure 400*b* may have a triangular shape.

In FIG. 3, the first structure 400*a* is shown as formed on an outer surface of the printing roll frame 220, and the second structure 400*b* is formed on an outer surface of the substrate stage frame 320. However, the first structure 400*a* may be formed on the inner surface of the printing roll frame 220, and the second structure 400*b* may be formed on the inner surface of the substrate stage frame 320.

The vertical vibration dampener 500 includes a third structure 500*a* formed on the printing roll frame 220 supporting the printing roll 200, and a fourth structure 500*b* formed on the substrate stage frame 320 supporting the substrate stage 300. When the third structure 500*a* and the fourth structure 500*b* are connected, vertical vibration of the printing roll 200 is prevented or reduced. The third structure 500*a* has a projection or a recess shape, and the fourth structure 500*b* has a recess or a projection shape. More particularly, the shapes of the third structure 500*a* and the fourth structure 500*b* are complementary. When the third structure 500*a* has a projection shape, the fourth structure 500*b* has a recess shape, and when the third structure 500*a* has a recess shape, the fourth structure 500*b* has a projection shape. For the purposes of illustration, in FIG. 3 the third structure 500*a* is shown as a projection having a triangular shape while the fourth structure 500*b* is shown as a recess having a triangular shape. The third structure 500*a* and the fourth structure 500*b* may have other complementary or engaging shapes.

In FIG. 3, the third structure 500*a* is illustrated as formed on the outer surface of the printing roll frame 220, and the fourth structure 500*b* is illustrated as formed on the outer surface of the substrate stage frame 320. However, the third structure 500*a* may be formed on the inner surface of the printing roll frame 220, and the fourth structure 500*b* may be formed on the inner surface of the substrate stage frame 320.

Hereinafter, with reference to FIGS. 4A and 4B, a method for reducing horizontal vibration of the printing roll 200 through the engagement of the first structure 400*a* and the second structure 400*b* and a method for reducing vertical vibration of the printing roll 200 through the connection of the third structure 500*a* and the third structure 500*b* will be described.

First, the method for reducing horizontal vibration of the printing roll 200 is described.

As shown in FIG. 4A, the first structure 400*a* having the shape of a spherical bearing is formed on the printing roll frame 220, and the second structure 400*b* having a triangular shape is formed on the substrate stage frame 320.

As shown in FIG. 4B, the second structure 400*b* moves upward and the inclined surface of the second structure 400*b* contacts the curved surface of first structure 400*a*, thereby preventing or reducing horizontal vibration of the printing roll 200.

The engagement of the first and second structures 400*a* and 400*b* of the horizontal vibration dampener is performed when the printing roll 200 and the anilox roll 100 are engaged with each other and rotated therewith while a designated material is supplied from the anilox roll 100 to the printing roll 200. After supply of the designated material to the printing roll 200 is completed, the second structure 400*b* moves downwardly and separates from the first structure 400*a* to allow the printing roll 200 to be separated from the anilox roll 100 as illustrated in FIG. 4A. The anilox roll 100 moves on the substrate stage 300, depositing the designated material on a substrate mounted on the substrate stage 300.

Next, the method for reducing vertical vibration of the printing roll 200 is described.

As shown in FIG. 4B, the third structure 500*a* having a projection shape is formed on the printing roll frame 220, and the fourth structure 500*b* having a recess shape is formed on the substrate stage frame 320.

As shown in FIG. 4B, the fourth structure 500*b* is rotated to contact the third structure 500*a*, thereby preventing or reducing vertical vibration of the printing roll 200. If the third structure 500*a* and the fourth structure 500*b* have complementary shapes, the third structure 500*a* and the fourth structure 500*b* may fit together to engage each other when contacting each other.

The connection of the third and fourth structures 500*a* and 500*b* of the vertical vibration dampener is performed when the printing roll 200 and the anilox roll 100 are engaged with each other and rotated therewith so that the designated material is supplied from the anilox roll 100 to the printing roll 200. Thereafter, the fourth structure 500*b* is rotated and separated from the third structure 500*a* to allow the printing roll 200 to separate from the anilox roll 100. The printing roll 200 moves on the substrate stage 300 depositing the designated material on the substrate mounted on the substrate stage 300.

Hereinafter, a roll printing method using the roll printing device of the second embodiment will be described.

First, the printing roll 200 is fixed to prevent or reduce vibration.

The fixation of the printing roll 200 is performed by at least one of the method for reducing horizontal vibration of the printing roll 200 and the method for reducing vertical vibration of the printing roll 200.

That is, the printing roll 200 is fixed using at least one of the method for reducing horizontal vibration of the printing roll 200 by engaging the first structure 400*a* having the curved surface formed on the printing roll frame 220 with the second structure 400*b* having the inclined surface formed on the substrate stage frame 320 and the method for reducing vertical vibration of the printing roll 200 by connecting the third structure 500*a* having the projection or recess shape formed on the printing roll frame 220 and the fourth structure 500*b* having the recess or projection shape formed on the substrate stage frame 320.

Once the printing roll is fixed, the dispenser supplies the designated material to the rotating anilox roll 100.

The anilox roll 100 supplies the designated material to the printing roll 200, which is engaged with the anilox roll 100 and rotated therewith.

The dispensing of the designated material to the anilox roll 100 and the supply of the designated material from the anilox roll 100 to the printing roll 200 may be performed simultaneously.

By using the doctor roll engaged with the anilox roll 100 and rotated therewith, or the doctor blade contacting the anilox roll 100, the designated material is uniformly supplied to the printing roll 200 from the anilox roll 100.

Thereafter, the fixation of the printing roll 200 is released.

The release of the fixation of the printing roll 200 is performed by releasing the connection performed by the method for reducing horizontal vibration of the printing roll 200 or the method for reducing vertical vibration of the printing roll 200.

That is, when the fixation of the printing roll 200 is performed by the horizontal vibration reducing method, the fixation of the printing roll 200 may be released by releasing the engagement of the first structure 400*a* having the curved surface formed on the printing roll frame 220 and the second structure 400*b* having the inclined surface formed on the substrate stage frame 320.

When the fixation of the printing roll 200 is performed by the vertical vibration reducing method, the fixation of the printing roll 200 may be released by releasing the connection of the third structure 500*a* having the projection or recess shape formed on the printing roll frame 220 and the fourth structure 500*b* having the recess or projection shape formed on the substrate stage frame 320.

Thereafter, the printing roll 200 moves on the substrate stage depositing the designated material on the printing roll 200 onto the substrate mounted on the substrate stage 300.

By moving the printing roll 200 rather than the substrate stage 300, the space occupied by the roll printing device does not increase when the size of the substrate is increased. Further, by employing the horizontal and vertical vibration dampeners 400 and 500 while the printing roll 200 and the anilox roll 100 are engaged, vibration of the printing roll 200 can be eliminated or reduced.

A method for manufacturing liquid crystal display device will be described hereinafter.

First, a lower substrate and an upper substrate are prepared.

The elements for the lower substrate and the upper substrate are appropriately formed and arranged according to the driving mode of the liquid crystal display device.

In particular, when the liquid crystal display device is a Twisted Nematic (TN) mode device, gate lines and data lines that cross substantially perpendicularly to define pixel regions on the lower substrate; TFTs (thin film transistors) are formed at the crossings of the gate lines and the data lines to serve as switching elements; and pixel electrodes are formed in the pixel regions and connected to a TFT to serve as electrodes to form an electric field. A light shielding layer to prevent light leakage, color filter layers to form colors; and common electrodes to serve as electrodes to form the electric field are formed on the upper substrate of the TN mode device.

When the liquid crystal display device is an In Plane Switching (IPS) mode device, gate lines and data lines are formed that cross substantially perpendicularly intersect to define pixel regions on the lower substrate; TFTs are formed at the crossings of the gate lines and the data lines to server switching elements; and pixel electrodes and common electrodes are formed in the pixel regions to serve as pairs of electrodes to form an electric field therebetween. A light shielding layer to prevent light leakage and color filter layers to form colors are formed on the upper substrate of the IPS mode device.

Thereafter, an orientation film is deposited on at least one of the lower and upper substrates.

Depositing the orientation film employs the above-described roll printing method, which uses an orientation material as the designated material.

After the deposition of the orientation film, the orientation film is given a uniform orientation direction using a rubbing method or a light irradiating method.

Thereafter, a liquid crystal layer is formed between the lower and upper substrates.

The formation of the liquid crystal layer may be achieved by an injection method or a liquid crystal dispensing or dropping method.

In the injection method, a sealant is deposited or formed on one of the lower and upper substrates to form a sealant layer having an injection port; the two substrates are bonded to each other; and liquid crystal is injected into a space between the bonded substrates through the injection port.

In the liquid crystal dispensing method, a sealant is deposited or formed on one of the upper and lower substrates; liquid crystal is dropped on one of the upper and lower substrates; and the two substrates are bonded to each other.

As described above, the embodiments of the present invention provide advantages as follows.

First, by moving the printing roll rather than the substrate stage 300, the space occupied by the roll printing device does not increase when the size of the substrate is increased.

Secondly, by using the horizontal and vertical vibration dampeners, it is possible to prevent or reduce vibration of the printing roll when the printing roll is engaged with an anilox roll and rotated therewith, facilitating uniform printing of a designated material onto the printing roll.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A roll printing device comprising:

a dispenser;

an anilox roll to receive a designated material dispensed by the dispenser;

a printing roll rotatable with the anilox roll to receive the designated material supplied from the anilox roll;

a substrate stage fixed below the printing roll to mount a substrate thereon; and a vibration dampener to reduce the vibration of the printing roll generated when the printing roll is rotated with the anilox roll, wherein the printing roll is movable on the substrate stage to deposit the designated material on the substrate.

2. The roll printing device as set forth in claim 1, further comprising a printing roll frame supporting the printing roll, and wherein the vibration dampener includes a horizontal vibration dampener having a first structure formed on a printing roll frame supporting the printing roll and having a curved surface, and a second structure formed on a substrate stage frame supporting the substrate stage and having an inclined surface.

3. The roll printing device as set forth in claim 2, wherein the first structure is a spherical bearing.

4. The roll printing device as set forth in claim 2, wherein the second structure has a triangular shape.

5. The roll printing device as set forth in claim 2, wherein the second structure is movable vertically to engage the inclined surface thereof to the curved surface of the first structure and to separate the inclined surface thereof from the curved surface of the first structure.

6. The roll printing device as set forth in claim 2, wherein the first structure is on the inner surface of the printing roll frame, and the second structure is on the inner surface of the substrate stage frame.

7. The roll printing device as set forth in claim 2, wherein the first structure is on the outer surface of the printing roll frame, and the second structure is on the outer surface of the substrate stage frame.

8. The roll printing device as set forth in claim 1, further comprising a printing roll frame supporting the printing roll and wherein the vibration dampener includes a vertical vibration dampener having a third structure formed on a printing roll frame supporting the printing roll and having one of a projection shape and a recess shape, and a fourth structure formed on a substrate stage frame supporting the substrate stage and having one of a recess shape and a projection shape.

9. The roll printing device as set forth in claim 8, wherein the third and fourth structures have complementary shapes.

10. The roll printing device as set forth in claim 8, wherein the fourth structure is rotatable vertically to contact the third structure and to separate from the third structure.

11. The roll printing device as set forth in claim 8, wherein the third structure is formed on the inner surface of the printing roll frame, and the fourth structure is formed on the inner surface of the substrate stage frame.

12. The roll printing device as set forth in claim 8, wherein the third structure is formed on the outer surface of the printing roll frame, and the fourth structure is formed on the outer surface of the substrate stage frame.

13. The roll printing device as set forth in claim 1, further comprising a doctor roll engaged with the anilox roll and rotated therewith to substantially uniformly supply the designated material from the anilox roll to the printing roll.

14. The roll printing device as set forth in claim 1, further comprising a doctor blade contacting the anilox roll to substantially uniformly supply the designated material from the anilox roll to the printing roll.

* * * * *